United States Patent
Song

(10) Patent No.: US 8,799,828 B2
(45) Date of Patent: Aug. 5, 2014

(54) SCROLLING METHOD AND APPARATUS FOR ELECTRONIC DEVICE

(75) Inventor: Hyun-Keun Song, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 13/329,049

(22) Filed: Dec. 16, 2011

(65) Prior Publication Data

US 2012/0173983 A1  Jul. 5, 2012

(30) Foreign Application Priority Data

Dec. 29, 2010 (KR) .................. 10-2010-0137692

(51) Int. Cl.
G06F 3/033 (2013.01)
G06F 3/0485 (2013.01)
G06F 3/0488 (2013.01)

(52) U.S. Cl.
CPC .......... *G06F 3/0485* (2013.01); *G06F 3/04883* (2013.01)
USPC .......................................... 715/863; 715/784

(58) Field of Classification Search
USPC ........................................ 715/720, 784, 763
See application file for complete search history.

(56) References Cited

U.S. PATENT DOCUMENTS

| | | | |
|---|---|---|---|
| 2009/0231271 A1* | 9/2009 | Heubel et al. | 345/156 |
| 2009/0249258 A1* | 10/2009 | Tang | 715/863 |
| 2010/0251189 A1* | 9/2010 | Jaeger | 715/863 |
| 2011/0154196 A1* | 6/2011 | Icho et al. | 715/702 |
| 2011/0298708 A1* | 12/2011 | Hsu et al. | 345/158 |

FOREIGN PATENT DOCUMENTS

KR  10-2010-0033716  3/2010

* cited by examiner

*Primary Examiner* — Omar Adul-Ali

(57) ABSTRACT

A method and apparatus scroll a screen in a device with a touchscreen. A method for scrolling a device with a touchscreen includes determining whether a current touch input is a circular drag touch; if the current touch input is the circular drag touch, determining whether a current page is a scrollable screen; and if the current page is a scrollable screen, scrolling the current page according to a circle drawing action of the circular drag touch.

20 Claims, 4 Drawing Sheets

SCROLLING METHOD AND APPARATUS FOR ELECTRONIC DEVICE

CROSS-REFERENCE TO RELATED APPLICATION AND CLAIM OF PRIORITY

The present application is related to and claims priority under 35 U.S.C. §119 to an application filed in the Korean Intellectual Property Office on Dec. 29, 2010 and assigned Serial No. 10-2010-0137692, the contents of which are incorporated herein by reference.

TECHNICAL FIELD OF THE INVENTION

The present invention relates generally to a screen scrolling method and apparatus for an electronic device using a touchscreen, and in particular, to a scrolling method and apparatus for an electronic device, which are capable of eliminating the inconvenience of a continuous and repetitive touch action and scrolling an entire screen through a simple touch action.

BACKGROUND OF THE INVENTION

Due to the remarkable development of information communication technology and semiconductor technology, the prevalence and use of portable electronic devices are rapidly increasing. Examples of the portable electronic devices include portable terminals for voice and video calls, MP3 players, and Portable Multimedia Players (PMP).

In particular, recent portable terminals provide a variety of new functions, such as multimedia, wireless Internet, Near Field Communication (NFC), and mobile broadcast reception, as well as traditional communication functions, such as voice call or text message service. In addition, recent portable terminals are under developments in terms of size, design, resolution, and user interface.

Due to this trend, touchscreens capable of performing both data input and data output have been applied to portable terminals. A touchscreen is an input/display device that performs data input and data output on a single screen. To be specific, data output is performed by a Liquid Crystal Display (LCD) panel, and data input is performed by a transparent touch panel disposed on the LCD panel. Such a touchscreen eliminates the use of an existing keypad (for example, an input device using a mechanical metal dome), leading to an increase in a display area and enabling a user to manipulate the touchscreen intuitively. Therefore, portable terminal manufacturers have paid much attention to touchscreens and have conducted extensive research and development in relation to the touchscreens.

Meanwhile, in the case where a touchscreen is employed in a portable terminal, the screen size (less than several inches) of the touchscreen is smaller than that of a general display device such as a computer monitor, and therefore, it is unsuitable for fully displaying various menus of the portable terminal (for example, an address book) or a high-resolution image on a single screen. To supplement this limitation, the touchscreen is provided with a scroll function.

In a conventional touchscreen, a scroll function is performed in such a manner that a user drags his or her finger on a scrollable screen continuously and repetitively. If a large-capacity image displayed on the touchscreen is scrolled using the conventional scrolling method, it may be difficult to find a current position, and a continuous and repetitive touch may degrade the use feeling of the touchscreen.

SUMMARY OF THE INVENTION

To address the above-discussed deficiencies of the prior art, it is a primary aspect of the present disclosure to solve at least the above problems and/or disadvantages and to provide at least the advantages below. Accordingly, an aspect of the present disclosure is to provide a scrolling method and apparatus for an electronic device, which are capable of scrolling an entire screen through one-time touch manipulation.

Another object of the present disclosure is to provide a scrolling method and apparatus for an electronic device, which are capable of simply scrolling an entire screen through one-time manipulation, contributing to the convenient use of the electronic device.

Another object of the present disclosure is to provide a scrolling method and apparatus for an electronic device, which are capable of reinforcing a search function due to a simple manipulation.

In accordance with an exemplary embodiment of the present disclosure, a scrolling method for a device with a touchscreen is provides. The scrolling method includes determining whether a current touch input is a circular drag touch, determining whether a current page is a scrollable screen if the current touch input is the circular drag touch, and scrolling the current page according to a circle drawing action of the circular drag touch if the current page is a scrollable screen.

In accordance with an exemplary embodiment of the present disclosure, a device with a touchscreen is provided. The device includes a touchscreen for data input and data output, a touch event processing unit for calculating a coordinate value inputted to the touchscreen and detecting a circular drag touch, and a control unit for performing a control to scroll a scrollable screen, which is currently displayed, by the circular drag touch detected by the touch event processing unit.

Before undertaking the DETAILED DESCRIPTION OF THE DISCLOSURE below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4D, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Preferred embodiments of the present invention will be described herein below with reference to the accompanying drawings. In the following description, detailed descriptions of well-known functions or configurations will be omitted since they would unnecessarily obscure the subject matters of the present invention.

A portable terminal and a scrolling method thereof will be described below; however, the present disclosure is not limited thereto. The present disclosure can be applied to a variety of electronic devices having a touchscreen and requiring a scroll screen.

Figure 1:
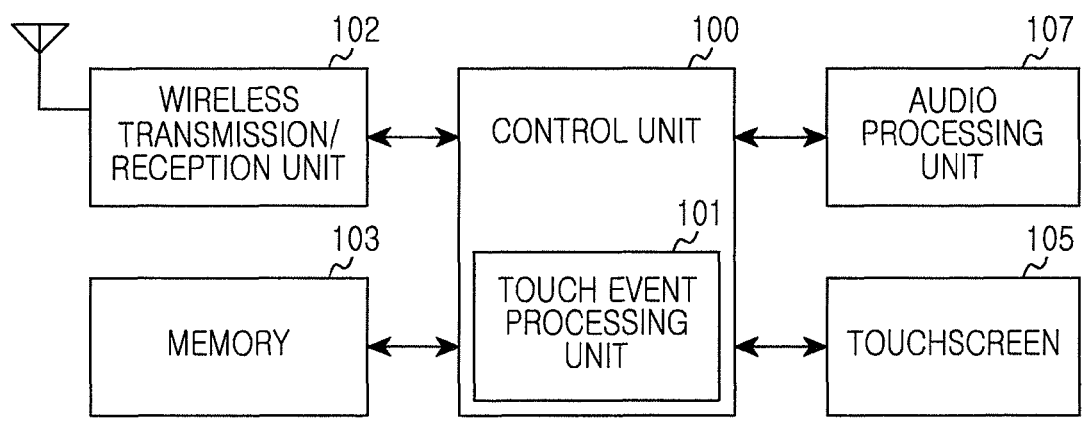
FIG. 1 illustrates a block diagram of a portable terminal according to an exemplary embodiment of the present disclosure.

FIG. 1 illustrates a block diagram of a portable terminal according to an exemplary embodiment of the present disclosure.

The portable terminal according to the exemplary embodiment of the present disclosure includes a control unit 100, a wireless transmission/reception unit 102, a memory 103, an audio processing unit 107, and a touchscreen 105.

The touchscreen 105 is a combination of a touchpad and a display device, such as, for example, a Liquid Crystal Display (LCD) or an Organic Light Emitting Diode (OLED). Under the control of the control unit 100, the touchscreen 105 displays a user interface, such as, for example, menus and keys of the portable terminal, and an execution screen for application programs, and provides the control unit 105 with an event signal corresponding to a user's touch input. In addition, if a user draws a circle in order for a scrolling while a scrollable screen is being displayed, the touchscreen 105 provides the control unit 100 with coordinate values of a corresponding display region.

The control unit 100 controls an overall operation of the portable terminal. The control unit 100 includes a touch event processing unit 101 that receives a touch signal corresponding to a user's circular drag touch on the touchscreen 105, and scrolls a currently displayed scrollable screen. The touch event processing unit 101 may detect and analyze a pattern of a circle drawn by the user, and control a scroll speed of the screen that is being currently scrolled. For example, the touch event processing unit 101 may control the scroll speed according to how fast the user draws the circle on the touchscreen 105 and how large the radius of curvature of the circle is. The control unit 100 may be configured to perform the functions of the touch event processing unit 101, without separate configurations.

In addition, the control unit 100 may determine a scroll direction and a scroll rate of the scroll screen that is being currently displayed, based on coordinate values provided according to a direction in which the user draws the circle on the touchscreen 105. The scroll screen may be applied to a scrolling of a large-capacity list such as a phone book, or a function of searching a video that is currently being played back.

In a receiving (RX) mode, the wireless transmission/reception unit 102 down-converts a Radio Frequency (RF) signal received through an antenna, and despreads and channel-decodes the down-converted RF signal. In a transmitting (TX) mode, the wireless transmission/reception unit 102 channel-encodes, spreads, and up-converts data prior to transmission.

The audio processing unit 107 receives a user's voice signal from a microphone, converts the received voice signal into a digital signal, encodes the digital signal in accordance with a voice communication protocol, and transmits the encoded digital signal through the wireless transmission/reception unit 107 to a portable terminal of a called party.

In addition, the audio processing unit 107 decodes a called party's voice signal provided from a portable terminal of the called party through the wireless transmission/reception unit 107, converts the decoded voice signal into an analog signal, and provides the analog signal to a speaker.

Figure 2:
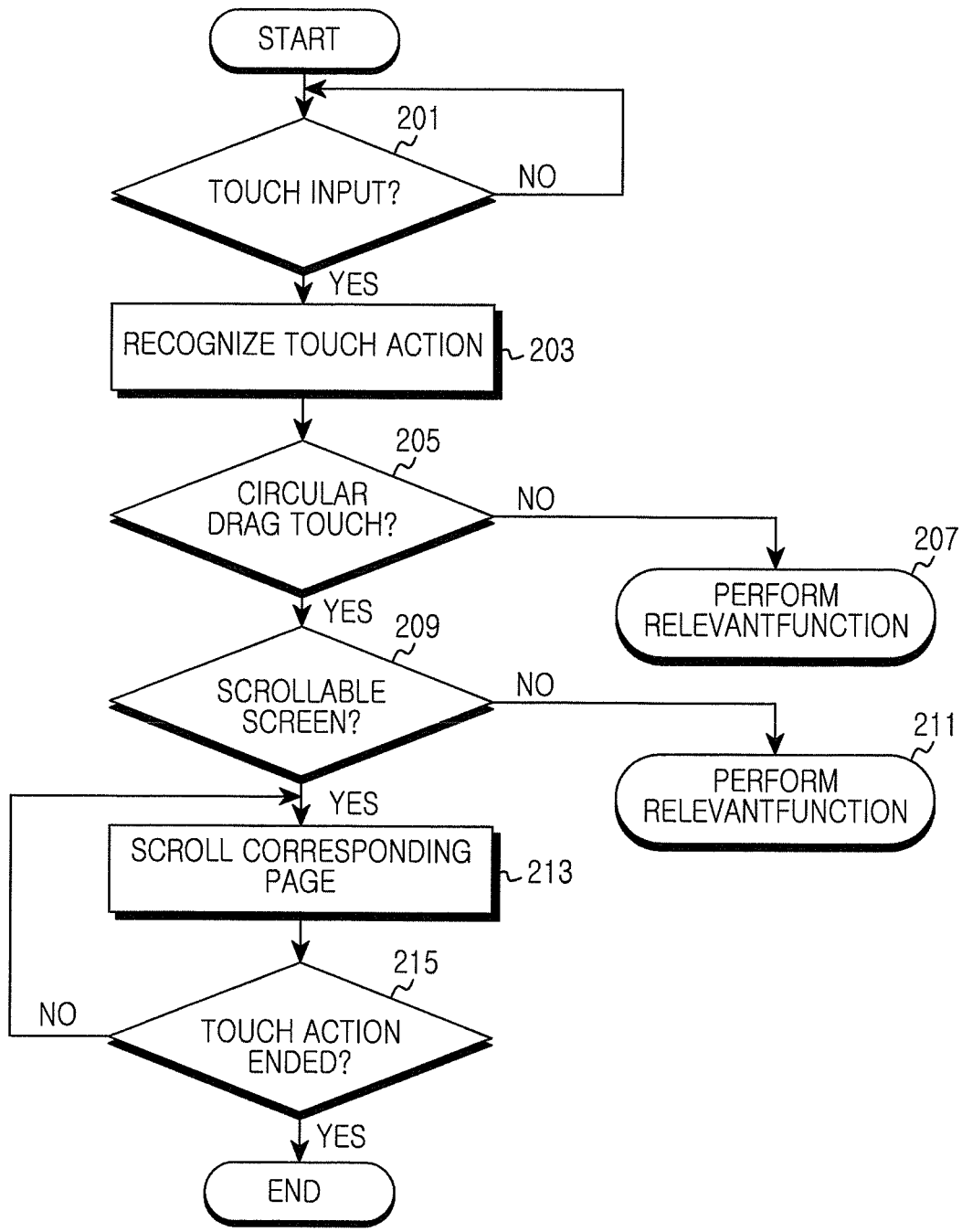
FIG. 2 illustrates a flow diagram for a scrolling procedure of a portable terminal according to an exemplary embodiment of the present disclosure.
Figures 3A, 3B:
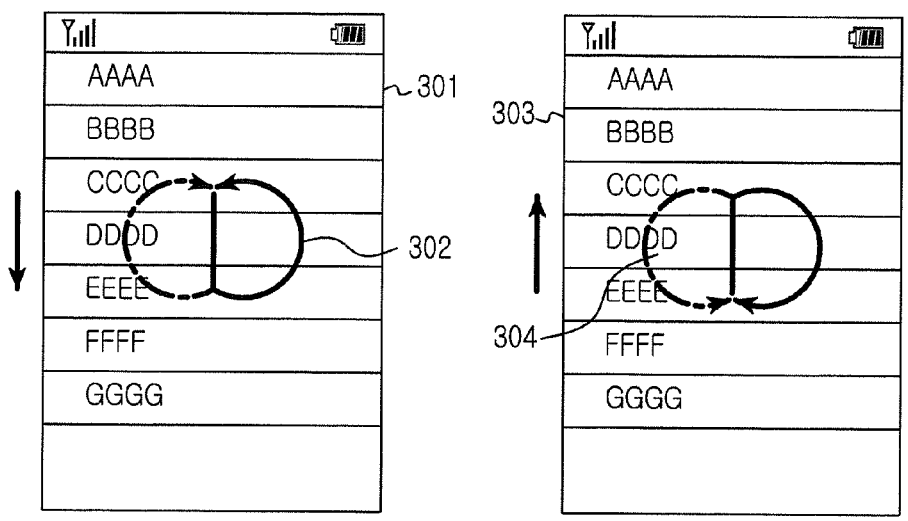
FIGS. 3A and 3B illustrate schematic diagrams for scrolling methods according to an exemplary embodiment of the present disclosure.
Figure 4D:
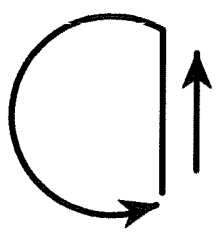
FIGS. 4A-4D illustrate exemplary diagrams for horizontal scrolling methods according to another exemplary embodiment of the present disclosure.
Figure 4C:
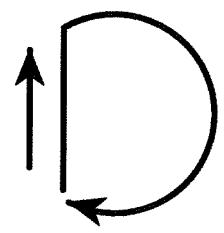
Figure 4B:
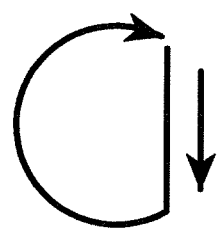
Figure 4A:
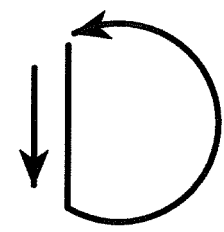

FIG. 2 illustrates a flow diagram for a scrolling procedure of a portable terminal according to an exemplary embodiment of the present disclosure, and FIGS. 3A and 3B illustrate schematic diagrams for scrolling methods according to an exemplary embodiment of the present disclosure.

Referring to FIGS. 2, 3A and 3B, the control unit determines whether a touch input is detected in step 201. If the touch input is detected, the control unit recognizes a touch action in step 203 and determines whether the touch input is a circular drag touch in step 205. If the recognized touch action is not a circular drag touch action but a general touch action, the control unit performs a relevant function in step 207.

If a user's circular drag touch is detected, the control unit determines whether a currently displayed screen is a scrollable screen in step 209. In an embodiment where the current screen is a moving picture playing screen, the control unit may determine whether the current screen is a scene searchable screen.

More specifically, the process of detecting the circular drag touch may be a process of detecting a series of circular drag touches after detecting a touch action for a scroll direction. That is, as illustrated in FIG. 3A, the control unit may determine a scroll direction and whether to scroll a screen by detecting a straight-line drag touch with a predetermined length along a scroll direction and then detecting a continuous circular drag touch.

In FIG. 3A, a scrollable page 301 is currently displayed, and a scroll action 302 may be performed by executing a straight-line drag touch downwardly by a predetermined length and drawing a circle clockwise or counterclockwise on the touchscreen. Although FIG. 3A illustrates that a straight line is drawn downwardly and a circle is drawn in a direction to surround the straight line, the circle may also be drawn clockwise or counterclockwise outwardly from the end position of the straight-line drag touch, instead of surrounding the straight line.

FIG. 3B illustrates an upward scrolling method. A scroll action 304 is performed by drawing a straight line with a predetermined length upwardly and drawing a circle clockwise or counterclockwise. In this example, the displayed page 303 is scrolled up according to the clockwise or counterclockwise drawing of the circle.

The control unit may control the scroll screen according to the length of a circular arc drawn by the user's circular drag touch action. The control unit may allow the user to view an entire scroll screen when the user draws one turn of a circle. However, the disclosure is not limited to the above example. The control unit may allow the user to view an entire scroll screen when the user draws two or more turns of a circle. In other examples, the scroll action may not be a perfect circle. For example, the control unit may detect the scroll action resembling any circular motion including, for example, an oval or rectangle shaped motion.

Furthermore, the scroll speed may be controlled according to the circle drawing speed of the user's circular drag and touch action or the radius of curvature of the circle.

Meanwhile, if the current screen is not a scrollable screen in step 209, a relevant function, not a scroll function, may be performed or a touch action may be ended, even though the circular drag touch is detected.

In step 213, the control unit scrolls a corresponding page. At this time, the control unit may control a scroll speed according to a shape of the circle drawn by the user's circular drag and touch action and a circle drawing speed.

In step 215, the control unit determines whether the touch action has ended. If the control unit determines that the touch action has not ended, the process returns to step 213. If, however, the control unit determines that the touch action has ended the process ends.

FIGS. 4A-4D illustrate exemplary diagrams for horizontal scrolling methods according to another exemplary embodiment of the present disclosure. The horizontal scrolling method may be used for searching a particular scene while a moving picture is being played back. If a horizontal straight-line touch is done on a screen where a moving picture is currently being played back, and then, a circular dragging is done clockwise or counterclockwise, a specific scene may be searched according to a shape and a size of a circle drawn by the circular dragging. The illustrative embodiments of FIGS. 4A and 4B may be applied to a forward search, and the illustrative embodiments of FIGS. 4C and 4D may be applied to a reverse search.

Consequently, the scrolling method and apparatus according to the exemplary embodiments of the present disclosure can conveniently display a variety of scroll screens from start to end through a user's one-time touch action, contributing to a convenient manipulation of the portable terminal.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A method for scrolling a device with a touchscreen, the method comprising:
   determining whether a current touch input is a continuous circular drag touch after a straight-line drag touch to form a circular drag touch;
   responsive to the current touch input being the circular drag touch, determining whether a current page is scrollable;
   responsive to the current page being scrollable, scrolling the current page according to a circle drawing action of the circular drag touch; and
   determining a scroll direction according to a direction of the straight-line drag touch.

2. The method of claim 1, wherein:
   the straight-line drag touch comprises a predetermined length.

3. The method of claim 1 further comprising:
   determining a scroll scale according to a length of a circular arc drawn by the circular drag touch.

4. The method of claim 1 further comprising:
   determining a scroll speed is according to a circular arc drawing speed of the circular drag touch.

5. The method of claim 1 further comprising:
   determining a scroll speed according to a radius of curvature of a circle drawn by the circular drag touch.

6. The method of claim 5 further comprising:
   increasing the scroll speed as the radius of curvature of the circle increases.

7. The method of claim 1 further comprising:
   scrolling an entire page of the scrollable screen when at least one turn of a circle is drawn by the circular drag touch.

8. The method of claim 1, wherein the scrollable screen corresponds to a scene search when a moving picture is being played back.

9. The method of claim 1, wherein the device is a mobile communication terminal.

10. The method of claim 1, further comprising:
    responsive to the current page not being scrollable, performing a function other than scrolling based on the circular drag touch.

11. A device, comprising:
    a touchscreen configured for data input and data output;
    a touch event processing unit configured to calculate a coordinate value input to the touchscreen and detect a continuous circular drag touch after a straight-line drag touch to form a circular drag touch; and
    a control unit configured to perform a control to scroll a scrollable page displayed by the touchscreen based on the circular drag touch detected by the touch event processing unit and to determine a scroll direction according to a direction of the straight-line drag touch.

12. The device of claim 11, wherein the straight-line drag touch comprises a predetermined length in a direction that is scrolled before the detection of the circular drag touch.

13. The device of claim 11, wherein the control unit is further configured to determine a scroll scale according to a length of a circular arc drawn by the circular drag touch.

14. The device of claim 11, wherein the control unit is further configured to determine a scroll speed according to a circular arc drawing speed of the circular drag touch.

15. The device of claim 11, wherein the control unit is further configured to determine a scroll speed according to a radius of curvature of a circle drawn by the circular drag touch.

16. The device of claim 15, wherein the control unit is further configured to increase the scroll speed as the radius of curvature of the circle increases.

17. The device of claim 11, wherein the control unit is further configured to perform a control to scroll an entire page of the scrollable screen when at least one turn of a circle is drawn by the circular drag touch.

18. The device of claim 11, wherein the scrollable screen is a moving picture playback screen.

19. The device of claim 11, wherein the device is a mobile communication terminal.

20. The device of claim 11, wherein the control unit is further configured, responsive to the current page not being scrollable, to perform a function other than scrolling based on the circular drag touch.

* * * * *